United States Patent
Wasicki

(10) Patent No.: US 10,623,818 B2
(45) Date of Patent: Apr. 14, 2020

(54) TELEVISION ADVERTISEMENT REDUCTION APPARATUS

(71) Applicant: Andrew Wasicki, Franklin, NJ (US)

(72) Inventor: Andrew Wasicki, Franklin, NJ (US)

(*) Notice: Subject to any disclaimer, the term of this patent is extended or adjusted under 35 U.S.C. 154(b) by 0 days.

(21) Appl. No.: 16/008,108

(22) Filed: Jun. 14, 2018

(65) Prior Publication Data

US 2019/0387282 A1    Dec. 19, 2019

(51) Int. Cl.
| H04N 21/472 | (2011.01) |
| H04N 21/44 | (2011.01) |
| H04N 21/2387 | (2011.01) |
| H04N 21/81 | (2011.01) |
| G06Q 30/02 | (2012.01) |

(52) U.S. Cl.
CPC ... H04N 21/47217 (2013.01); H04N 21/2387 (2013.01); H04N 21/44004 (2013.01); H04N 21/44008 (2013.01); H04N 21/812 (2013.01); G06Q 30/0241 (2013.01)

(58) Field of Classification Search
CPC ............ H04N 21/458; H04N 21/2387; H04N 21/44004; H04N 21/44008; H04N 21/812
USPC .......................................................... 725/32
See application file for complete search history.

(56) References Cited

U.S. PATENT DOCUMENTS

| 3,424,865 | A | | 1/1969 | Marchand | |
| 4,390,904 | A | | 6/1983 | Johnston et al. | |
| 4,750,052 | A | * | 6/1988 | Poppy | G11B 15/02 348/634 |
| 8,732,745 | B2 | | 5/2014 | McCoy et al. | |
| 9,686,591 | B2 | | 6/2017 | Look et al. | |
| 9,781,377 | B2 | | 10/2017 | Poniatowski et al. | |
| 9,826,274 | B2 | | 11/2017 | Wong | |
| 2003/0117530 | A1 | * | 6/2003 | McGee | H04N 5/44 348/700 |
| 2005/0226602 | A1 | * | 10/2005 | Schramel | G11B 27/105 386/248 |
| 2007/0009235 | A1 | * | 1/2007 | Walters | H04N 21/6581 386/278 |
| 2007/0286583 | A1 | * | 12/2007 | Candelore | H04N 5/76 386/225 |
| 2010/0061709 | A1 | * | 3/2010 | Agnihotri | H04N 5/445 386/241 |
| 2011/0022471 | A1 | * | 1/2011 | Brueck | G06Q 30/02 705/14.61 |
| 2012/0042247 | A1 | * | 2/2012 | Harper | G06Q 30/02 715/716 |
| 2017/0188116 | A1 | * | 6/2017 | Major | H04N 21/4334 |

* cited by examiner

Primary Examiner — Cynthia M Fogg

(74) Attorney, Agent, or Firm — Boudwin Intellectual Property; Daniel Boudwin

(57) ABSTRACT

A television advertisement reduction apparatus. The apparatus is embodied in a housing. The housing has an input and an output. The output connects to a video display. The housing has a processor therein that analyzes television streams. The processor delays the television stream while identifying advertisements. When the advertisements are identified, they can be skipped in the delayed television stream.

12 Claims, 3 Drawing Sheets

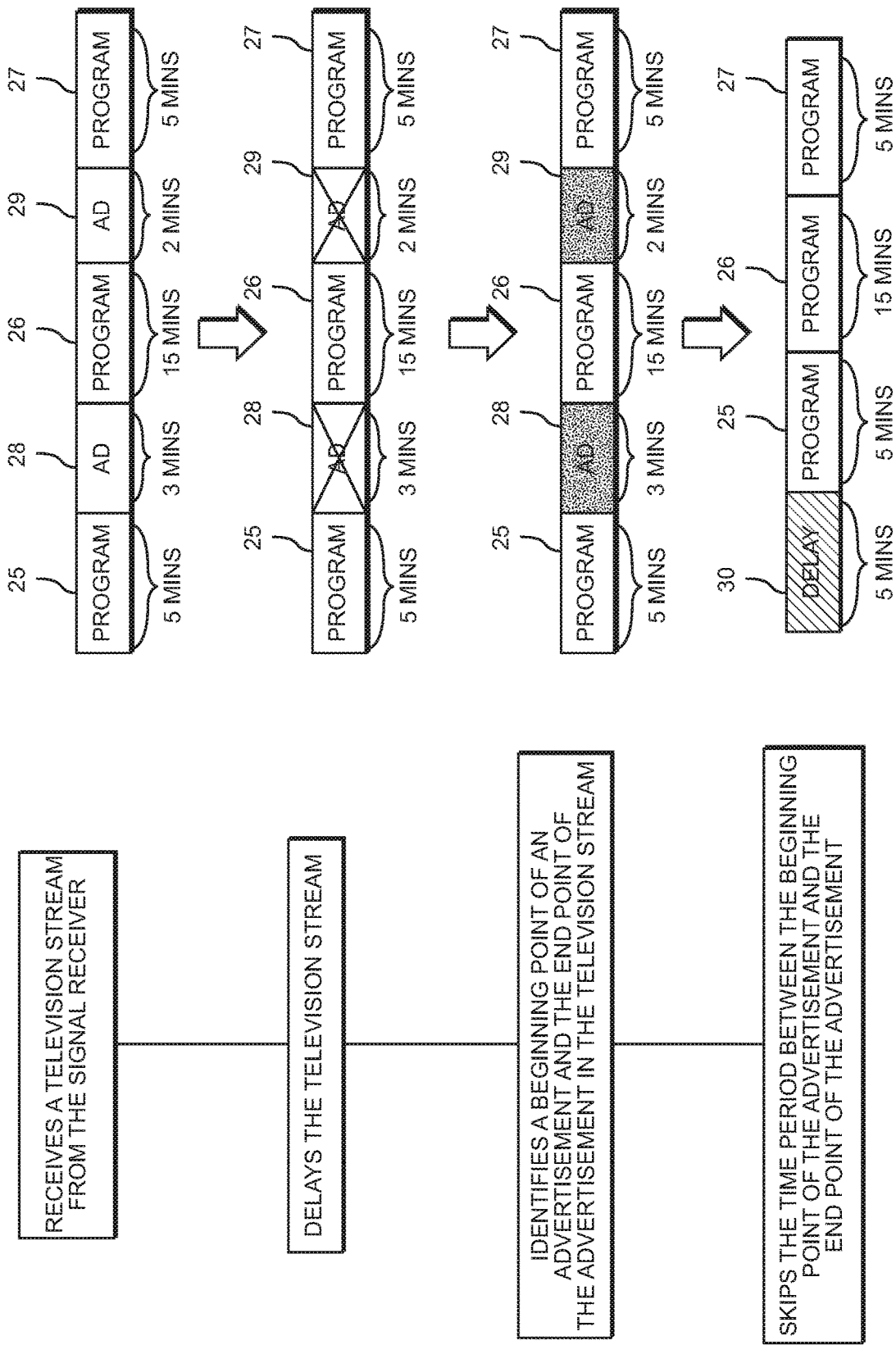

TELEVISION ADVERTISEMENT REDUCTION APPARATUS

BACKGROUND OF THE INVENTION

The present invention relates to a television advertisement reduction apparatus. Advertisements have become a significant part of television broadcasts. However, many viewers find television advertisements unpleasant or annoying. Because of the frustration and inconvenience provided by television advertisements, there is a need amongst the known art for an improved system for reducing the number f television advertisements that are aired during a desired television program.

There are a few known methods of blocking advertisements that are aired during television programming. Some of these methods involve analyzing broadcaster-derived metadata, sensing color changes or "fadeouts" that are associated with commercial breaks and using community-controlled identification tags wherein a plurality of users can label an advertisement with an identification tag. Once these advertisements are identified, a pre-recorded television stream can be edited such that the advertisements will be skipped or blocked.

However, these methods may be inconvenient or improper where the user wishes to view some advertisements, while eliminating others from the television stream. For example, an individual interested in a specific activity may prefer to have the option of viewing advertisements that are related to that activity. The present invention seeks to resolve this problem in the known prior art by implementing a system within an apparatus where a viewer is given the choice of viewing a specific advertisement or skipping the specific advertisement.

SUMMARY OF THE INVENTION

In view of the foregoing disadvantages inherent in the known types of television advertisement reduction apparatuses now present in the known art, the present invention provides a television advertisement reduction apparatus wherein the same can be utilized for providing convenience for the user when applied upon a television system to reduce the number of advertisements that the viewer is subjected to.

The present system comprises a housing to house the components of the system. A processor is disposed inside of the housing. A video output port is disposed on an external surface of the housing. The video output port is adapted to connect to a video display device. Furthermore, the video output port is operably connected to the processor. A signal receiver is disposed in the housing and is operably connected to the processor.

The processor has a logic stored on an operably attached memory unit. The logic is configured to receive a television stream. Additionally, the logic delays the television stream. The logic identifies a beginning point of an advertisement and an end point of the advertisement. A portion of the stream between the beginning point and the end point is removed from the stream.

It is an object of the present invention to additionally provide a wireless remote control that is operably connected to the processor.

Another object of the present invention is to provide a wireless remote control that additionally includes an integrated display device.

Yet another object of the present invention is to provide a logic that is further programmed to assign a unique identification tag to each advertisement of a plurality of advertisements. The logic can recognize each unique identification tag as a television stream is received. A prompt is generated after the tag is recognized, giving a viewer the choice of watching the corresponding advertisement or skipping the corresponding advertisement.

A further object of the present invention is to provide a logic that is further configured to display the prompt on the integrated display of the wireless remote control.

Yet a further object of the present invention is to provide a logic that is programmed to determine the running length of a desired program. Additionally, the logic is programmed to use the running length to determine a shortest possible delay period that a program must be delayed by in order to view a program uninterrupted by commercial breaks.

BRIEF DESCRIPTION OF THE DRAWINGS

Although the characteristic features of this invention will be particular pointed out in the claims, the invention itself and manner in which it may be made and used may be better understood after a review of the following description, taken in connection with the accompanying drawings wherein like numeral annotations are provided throughout.

FIG. 3 shows a block diagram of an embodiment of the television advertisement reduction apparatus.

FIG. 4 shows an illustrative diagram of an exemplary use of the television advertisement reduction apparatus.

DETAILED DESCRIPTION OF THE INVENTION

Figure 1:
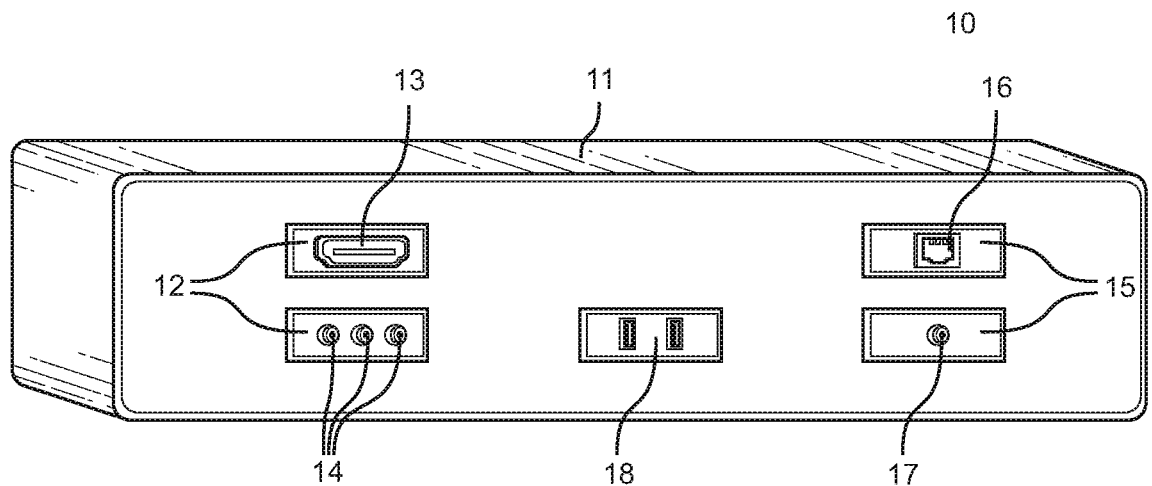
FIG. 1 shows a rear view of a housing of an embodiment of the television advertisement reduction apparatus.

Reference is made herein to the attached drawings. Like reference numerals are used throughout the drawings to depict like or similar elements of the television advertisement reduction apparatus. The figures are intended for representative purposes only and should not be considered to be limiting in any respect.

Referring now to FIG. 1, there is shown a rear view of an embodiment of the television advertisement reduction apparatus. The television advertisement reduction apparatus 10 comprises a housing 11. A processor is disposed in the housing 11. The housing 11 further comprises at least one video output port 12. In this illustrated embodiment, a pair of video output ports 12 are disposed on a rear surface of the housing, the pair consisting of a first video output port being a High-Definition Multimedia Interface (HDMI) output port 13 and a second video output port being a composite video and audio output port 14. The output port 12 is any output port configured to connect to a video display device, such as a television.

The housing further comprises at least one signal receiver 15. In the illustrated embodiment, a pair of signal receivers 15 are disposed on the rear surface of the housing 11. In the shown embodiment, the pair of signal receivers 15 is comprised of an ethernet port 16 and a coaxial cable port 17. The signal receiver 15 is any media receiver wherein a video transmission is received thereby. Additionally, the signal receiver 15 is operably connected to the processor.

In one embodiment, a power input 18 is disposed on the rear surface of the housing. The power input 18 is configured to receive a power cable therein. When the power cable is received into the power input 18, power is provided to the device.

Figure 2:
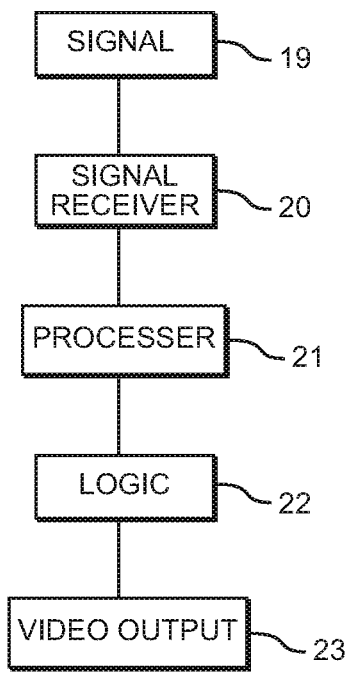
FIG. 2 shows a block diagram of the components of the television advertisement reduction apparatus.

Referring now to FIG. 2, there is shown a block diagram of the components of the television advertisement reduction apparatus. The signal 19 from a video transmission is received by the signal receiver 20 on the housing. The signal receiver 20 is operably connected to the processor 21 disposed in the housing. The processor 21 is disposed in the housing. The processor 21 comprises a logic 22 that analyzes the signal 19 from the video transmission. The processor 21 is also configured to display a video stream on a video output 23.

Referring now to FIG. 3, there is shown a block diagram of a logic of an embodiment of the television advertisement reduction apparatus. The processor has a logic stored thereon. The logic is configured to analyze a television stream received from the signal receiver. For example, some methods of analyzation involve analyzing the television stream for broadcaster-derived metadata corresponding to advertisements, color changes corresponding to advertisements or "fadeouts" that are associated with commercial breaks.

The logic is further configured to delay the television stream by a determined interval. In one embodiment, the determined interval is calculated by adding the running length of each advertisement together. As such the determined interval corresponds to the maximum amount of time by which a program can be skipped.

Additionally, the logic is configured to identify a beginning point of an advertisement and an end point of the advertisement. By identifying both the beginning point of the advertisement and the end point of the advertisement, the logic is configured to isolate each individual advertisement. With each advertisement isolated and the stream in a delayed state, the advertisement say be removed from the stream. In one embodiment, the user chooses the delay interval. In another embodiment, the program determines the interval timing.

Referring now to FIG. 4, there is shown an illustrative diagram of an exemplary use of the logic of the television advertisement reduction apparatus. In the shown illustrative example, the television stream contains a first segment of a program 25, a second segment of the program 26 and a third segment of the program 27. The first segment 25 is five minutes in length, the second segment 26 is fifteen minutes in length, the third segment 27 is five minutes in length.

A first advertisement 28 is disposed in the stream between the first segment 25 and the second segment 26. A second advertisement 29 is disposed in the stream between the second segment 26 and the third segment 27.

The logic identifies the starting point and the ending point of each advertisement 28, 29 such that each advertisement can be skipped. As shown, the first advertisement 28 and the second advertisement are removed from the television stream 24.

Furthermore, the delay 30 is calculated by adding the running length of the first advertisement 28 and the second advertisement 29 together. In the shown embodiment, the first advertisement 28 is three minutes in length and the second advertisement 29 is two minutes in length. As such, the delay 30 is five minutes in length. The delay 30 is accounted for prior to the playback of the television programming 25, 26, 27, which can be played seamlessly and without advertisements. As such, the user must wait the delay 30 time in order to watch the program without breaks.

Figure 5:
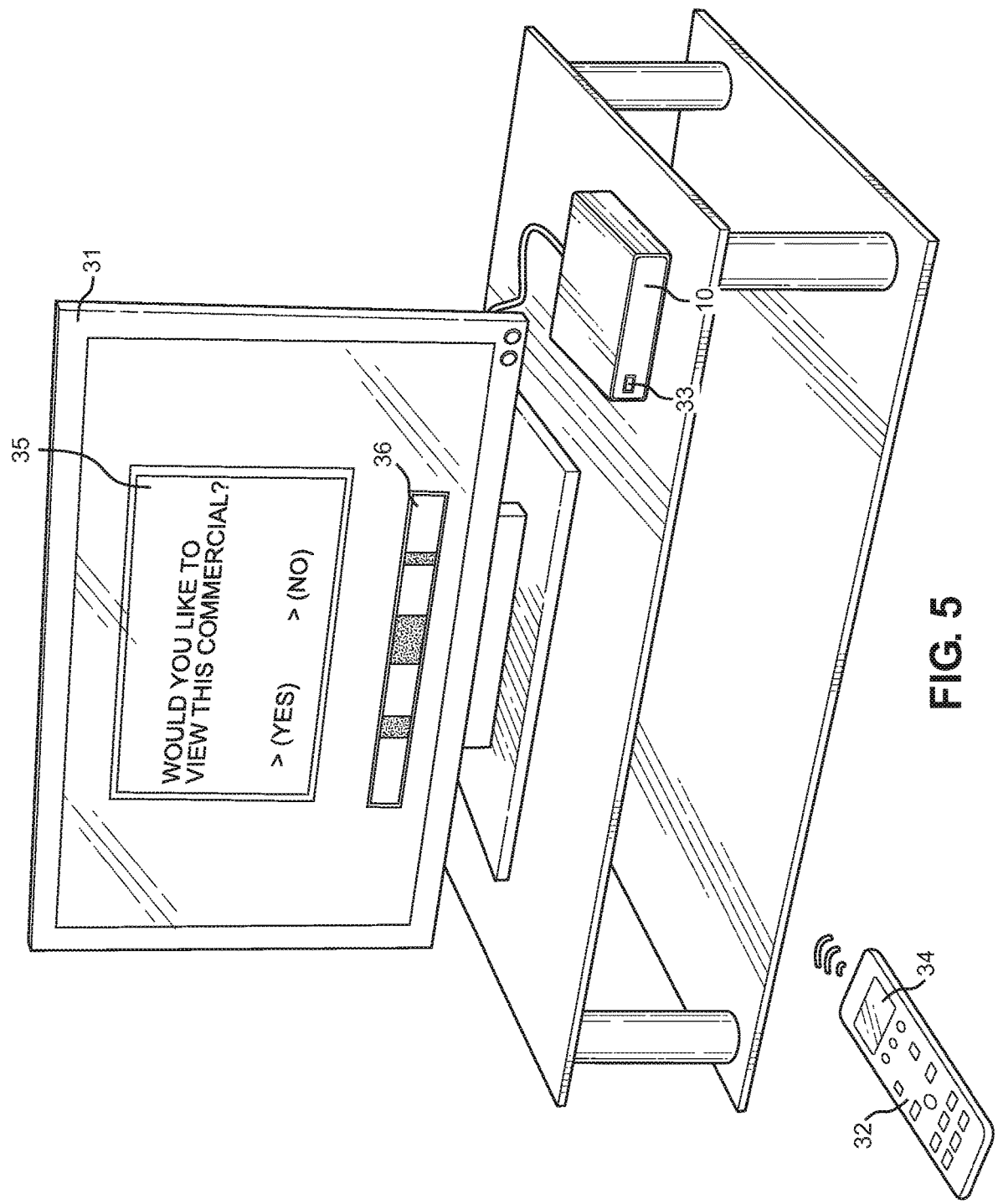
FIG. 5 shows an in-use view of an embodiment of the television advertisement reduction apparatus.

Referring now to FIG. 5, there is shown an in-use view of an embodiment of the television advertisement reduction apparatus. The television advertisement reduction apparatus 10 can be plugged into a video display device, such as a television 31.

In the shown embodiment, the television advertisement reduction apparatus comprises a remote control 32. The remote control 32 is in operable wireless connection with the television advertisement reduction apparatus 10 via a sensor 33 thereon. The remote control 32 is configured to control the processor. In a further embodiment, the remote control 32 comprises a display screen 34 thereon. In yet another embodiment, the remote control 32 is configured to pause and resume the television stream.

Additionally, in the shown embodiment, the television advertisement reduction apparatus 10 is further configured to provide a visual overlay on the display screen 31 when the remote control 32 is actuated. In the shown embodiment, the visual overlay comprises a prompt 35 and a sequence bar 36. The prompt 35 is configured to give a user the option of watching an advertisement. In one embodiment, the television advertisement reduction apparatus 10 further comprises a memory unit. The memory unit is configured to store a user preference profile, such that advertisements that the user wishes to watch are stored and displayed during an advertisement portion of a television stream. The user preference profile is generated by a response given by the user to the prompt 35.

The prompt 35 is generated by the processor. Under this embodiment, the logic is further configured to generate the prompt 35. The logic is configured to assign a unique identification tag to a specific advertisement. Once the prompt is provided to the user on the video display device 31, the user will provide a response to the request. The response will be stored on a memory device. The prompt 35 will enable the user to skip the advertisement or to view the advertisement.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A television advertisement reduction apparatus, comprising:
   a housing having a processor disposed therein;
   the processor operably connected to a pair of video output ports disposed on an external surface of the housing;
   wherein the pair of video output ports consists of a high-definition multimedia output port and a composite video and audio output port;

the pair of video output ports configured to connect to at least one video display device;
a pair of signal receivers operably connected to the processor;
the pair of signal receivers consisting of an ethernet port and a coaxial cable port;
the processor having a logic;
the processor in operable connection with a memory unit;
the logic configured to:
   receive a television stream;
   determine a program running length for a desired program;
   calculate a delay period;
   wherein the delay period is the shortest amount of time by which a program can be delayed such that an entirety of advertisements of the desired program can be skipped;
   delay the television stream;
   identify a beginning point of an advertisement and an end point of the advertisement in the television stream;
   skip the time period between the beginning point of the advertisement and the end point of the advertisement;
   assign a unique identification tag to each advertisement, the identification tag being stored on a memory unit;
   recognize the identification tag as the television stream is received;
   generate a prompt on the video display device allowing a user to view the advertisement or to skip the advertisement;
   store a response to the prompt on the memory unit in association with the identification tag;
   skip a commercial that is designated such by the user;
   play a commercial that is designated such by the user.

2. The television advertisement reduction apparatus of claim 1, further comprising a wireless remote control configured to control the processor.

3. The television advertisement reduction apparatus of claim 2, wherein the remote control is configured to pause the television stream and to resume the television stream.

4. The television advertisement reduction apparatus of claim 2, wherein the remote control comprises a display screen thereon.

5. The television advertisement reduction apparatus of claim 1, wherein the processor is further configured to provide a visual overlay on the video display device when actuated.

6. The television advertisement reduction apparatus of claim 1, wherein the prompt is generated on a display screen of a remote control.

7. The television advertisement reduction apparatus of claim 1, wherein the logic identifies the beginning point of the advertisement and the end point of the advertisement via broadcaster-derived metadata.

8. The television advertisement reduction apparatus of claim 1, wherein the logic identifies the beginning point of the advertisement and the end point of the advertisement via color changes.

9. The television advertisement reduction apparatus of claim 1, wherein the logic identifies the beginning point of the advertisement and the end point of the advertisement via fadeouts.

10. The television advertisement reduction apparatus of claim 1, wherein the delay period is adjustable by the user.

11. The television advertisement reduction apparatus of claim 5, wherein the visual overlay comprises a prompt and a sequence bar.

12. A television advertisement reduction apparatus, consisting of:
a housing having a processor disposed therein;
the processor operably connected to a pair of video output ports disposed on an external surface of the housing;
wherein the pair of video output ports consists of a high-definition multimedia output port and a composite video and audio output port;
the pair of video output ports configured to connect to at least one video display device;
a pair of signal receivers operably connected to the processor;
the pair of signal receivers consisting of an ethernet port and a coaxial cable port;
the processor having a logic;
the processor in operable connection with a memory unit;
the logic configured to:
   receive a television stream;
   determine a program running length for a desired program;
   calculate a delay period;
   wherein the delay period is the shortest amount of time by which a program can be delayed such that an entirety of advertisements of the desired program can be skipped;
   delay the television stream;
   identify a beginning point of an advertisement and an end point of the advertisement in the television stream;
   skip the time period between the beginning point of the advertisement and the end point of the advertisement;
   assign a unique identification tag to each advertisement, the identification tag being stored on a memory unit;
   recognize the identification tag as the television stream is received;
   generate a prompt on the video display device allowing a user to view the advertisement or to skip the advertisement;
   store a response to the prompt on the memory unit in association with the identification tag;
   skip a commercial that is designated such by the user;
   play a commercial that is designated such by the user.

* * * * *